(12) United States Patent
Wu et al.

(10) Patent No.: US 8,203,532 B2
(45) Date of Patent: Jun. 19, 2012

(54) PORTABLE MOUSE ATTACHABLE ON A SURFACE OF AN OBJECT

(75) Inventors: Chun-Che Wu, Taipei (TW); Chun-Nan Su, Taipei (TW)

(73) Assignee: Primax Electronics Ltd., Taipei (TW)

( * ) Notice: Subject to any disclaimer, the term of this patent is extended or adjusted under 35 U.S.C. 154(b) by 458 days.

(21) Appl. No.: 12/535,882

(22) Filed: Aug. 5, 2009

(65) Prior Publication Data

US 2010/0315341 A1 Dec. 16, 2010

(30) Foreign Application Priority Data

Jun. 12, 2009 (TW) .............................. 98119669 A

(51) Int. Cl.
*G06F 3/033* (2006.01)
(52) U.S. Cl. ....................................................... 345/163
(58) Field of Classification Search .................. 345/156, 345/163–167
See application file for complete search history.

(56) References Cited

U.S. PATENT DOCUMENTS

| | | | | |
|---|---|---|---|---|
| 6,366,274 B1* | 4/2002 | Elledge | .......................... | 345/163 |
| 7,710,398 B2* | 5/2010 | Machida | ........................ | 345/163 |
| 2007/0132731 A1* | 6/2007 | Lin et al. | ........................ | 345/163 |
| 2008/0165128 A1* | 7/2008 | Cheng et al. | ................... | 345/163 |

* cited by examiner

*Primary Examiner* — Chanh Nguyen
*Assistant Examiner* — Tsegaye Seyoum
(74) *Attorney, Agent, or Firm* — Kirton McConkie; Evan R. Witt

(57) ABSTRACT

A portable mouse includes a base, a casing, an attractable element and a control module. The control module includes a keycap, a triggering element, a positioning element and a retractable mechanism. The keycap is exposed outside a surface of the casing. By depressing the keycap, the attractable element is protruded out of the base, so that the attractable element could be attached on a surface of the object.

21 Claims, 3 Drawing Sheets

PORTABLE MOUSE ATTACHABLE ON A SURFACE OF AN OBJECT

FIELD OF THE INVENTION

The present invention relates to a mouse, and more particularly to a portable mouse.

BACKGROUND OF THE INVENTION

With increasing development of scientific technologies, multimedia products and computers become essential in our daily lives. In the computer systems, input devices play important roles for communicating the computer and the user. The common input devices of the computer systems include for example mice, keyboards or trackballs. Among these input devices, mice are the most prevailing because they are very easy-to-use. When a mouse is held on the palm of a user's hand, the user may move the mouse to control movement of the cursor shown on the computer screen. In addition, by operating the click buttons of the mouse device, the user may select a desired item on the function menu of the browsing frame or execute a corresponding function.

Recently, a variety of mice with diverse functions have been introduced into the market. For example, 3D or 4D wheel mice have scroll wheels. The uses of wireless mice do not need additional connecting wires. In addition, ergonomic mice are designed according to the shapes of human's palms.

Due to the portability, notebook computers become essential components for the businessmen when they travel to other places or take part in meetings. For example, when the user takes part in a meeting, the user could operate the touch pad of the notebook computer to control the notebook computer in replace of the mouse. For most users, since the touch pad is not easy-to-use, they prefer and get use to using the mouse. Under this circumstance, the user needs to simultaneously carry the notebook computer and the mouse to take part in the meeting. If the mouse is placed on the surface of the notebook computer, the mouse will slide on the notebook computer or drop off the notebook computer. In other words, it is troublesome to simultaneously carry such a mouse with the notebook computer.

Therefore, there is a need of providing a portable mouse so as to obviate the drawbacks encountered from the prior art.

SUMMARY OF THE INVENTION

The present invention provides a portable mouse, which is attachable on an object and permitted to be simultaneously carried with the object.

In accordance with an aspect of the present invention, there is provided a portable mouse attachable on a surface of an object. The portable mouse includes a base, a casing, an attractable element and a control module. The base includes a base recess. The casing is used for sheltering the base. The attractable element is disposed within the base recess and exposed to a surface of the base. The control module is disposed on the base for moving the attractable element. The attractable element is accommodated within the base recess when the control module is in a non-actuating status. The attractable element is protruded out of the base recess to be attached on the surface of the object when the control module is in an actuating status.

In an embodiment, the control module includes a keycap, a triggering element, a positioning element and a retractable mechanism. The keycap is exposed outside a surface of the casing. The triggering element is connected with the keycap and the attractable element. The attractable element is moved in response to a position shift of the triggering element. The positioning element is disposed on the base and contacted with the triggering element. The retractable mechanism is connected with the attractable element and contacted with the triggering element.

In an embodiment, the casing further includes a casing opening, and keycap of the control module penetrates through the casing opening to be exposed outside the surface of the casing.

In an embodiment, the triggering element further includes a fixing rod and a perforation. The fixing rod is inserted into the positioning element, so that a position of the triggering element is fixed by the positioning element. The retractable mechanism is inserted into the perforation and contacted with the triggering element.

In an embodiment, the retractable mechanism includes a sliding slot, a retractable slice and a spring. The retractable slice includes a protrusion and a retractable shaft. The retractable shaft is arranged at a first end of the retractable slice and inserted into the sliding slot such that the retractable shaft is movable along the sliding slot. The protrusion is arranged at a second end of the retractable slice, inserted into the perforation of the triggering element and contacted with the triggering element. The spring is connected with the retractable slice and the attractable element for providing an elastic force.

In an embodiment, the base further includes a sliding slot seat, and the sliding slot is formed in the sliding slot seat.

In an embodiment, if the keycap is not depressed and the control module in the non-actuating status, a surface of the keycap is coplanar with the surface of the casing, the retractable shaft of the retractable slice is located in a first position of the sliding slot, the spring is in a stretched status, the fixing rod of the triggering element is contacted with the positioning element, and the attractable element is accommodated within the base recess. Whereas, if the keycap is depressed and the control module in the actuating status, the triggering element is moved with the keycap to be sustained against the retractable slice such that the retractable shaft of the retractable slice is moved from the first position to a second position, the retractable slice is sustained against the spring such that the spring is in a compressed status, the fixing rod is moved to be inserted into the positioning element such that the triggering element is fixed by the positioning element, and the attractable element is moved to be protruded out of the base recess such that the portable mouse is attached on the object via the attractable element.

In an embodiment, the attractable element further comprises a detaching part, which is connected with the spring.

In an embodiment, the detaching part is integrated into the attractable element.

In an embodiment, if the portable mouse is attached on the object and the keycap is depressed, the triggering element is moved toward the base such that the fixing rod disengages from the positioning element, and the spring is switched from the compressed status to the stretched status to offer the elastic force. In response to the elastic force, the spring is sustained against the retractable shaft and the detaching part is moved with the spring, so that the retractable shaft is moved from the second position to the first position, the surface of the keycap is coplanar with the surface of the casing and the attractable element is returned to be accommodated within the base recess.

In an embodiment, during the detaching part is moved with the spring, the detaching part is uplifted and air is introduced inside the space between the attractable element and the object, thereby facilitating easy detachment of the attractable element from the object.

In an embodiment, the positioning element is a door lock.

In an embodiment, the attractable element is a suction cup.

In an embodiment, the object is a notebook computer.

In accordance with another aspect of the present invention, there is provided a portable mouse attachable on a surface of an object. The portable mouse includes a base, a casing, an attractable element, a keycap, a triggering element, a positioning element, a sliding slot, a retractable slice and a spring. The base includes a base recess. The casing is used for sheltering the base. The casing has a casing opening. The attractable element is disposed within the base recess and exposed to a surface of the base. The keycap penetrates through the casing opening and is exposed outside a surface of the casing. The triggering element is connected with the keycap and the attractable element, and arranged between the base and the casing. The attractable element is moved in response to a position shift of the triggering element. The positioning element is disposed on the base, arranged at a first side of the triggering element, and contacted with the triggering element. The retractable slice is arranged at a second side of the triggering element, and includes a protrusion and a retractable shaft. The retractable shaft is arranged at a first end of the retractable slice and inserted into the sliding slot such that the retractable shaft is movable along the sliding slot. The protrusion is arranged at a second end of the retractable slice and contacted with the triggering element such that the protrusion is moved with the triggering element. The spring is connected with the retractable slice and the attractable element for providing an elastic force. If the keycap is not depressed and the control module in the non-actuating status, a surface of the keycap is coplanar with the surface of the casing, the retractable shaft of the retractable slice is located in a first position of the sliding slot, the spring is in a stretched status, the fixing rod of the triggering element is contacted with the positioning element, and the attractable element is accommodated within the base recess. Whereas, if the keycap is depressed and the control module in the actuating status, the triggering element is moved with the keycap to be sustained against the retractable slice such that the retractable shaft of the retractable slice is moved from the first position to a second position, the retractable slice is sustained against the spring such that the spring is in a compressed status, the fixing rod is moved to be inserted into the positioning element such that the triggering element is fixed by the positioning element, and the attractable element is moved to be protruded out of the base recess such that the portable mouse is attached on the object via the attractable element.

In an embodiment, the triggering element further includes a fixing rod and a perforation. The fixing rod is inserted into the positioning element, so that a position of the triggering element is fixed by the positioning element. The retractable mechanism is inserted into the perforation and contacted with the triggering element.

In an embodiment, the base further includes a sliding slot seat, and the sliding slot is formed in the sliding slot seat.

In an embodiment, the attractable element further includes a detaching part, which is connected with the spring.

In an embodiment, the detaching part is integrated into the attractable element.

In an embodiment, if the portable mouse is attached on the object and the keycap is depressed, the triggering element is moved toward the base such that the fixing rod disengages from the positioning element, and the spring is switched from the compressed status to the stretched status to offer the elastic force. In response to the elastic force, the spring is sustained against the retractable shaft and the detaching part is moved with the spring, so that the retractable shaft is moved from the second position to the first position, the surface of the keycap is coplanar with the surface of the casing and the attractable element is returned to be accommodated within the base recess.

In an embodiment, during the detaching part is moved with the spring, the detaching part is uplifted and air is introduced inside the space between the attractable element and the object, thereby facilitating easy detachment of the attractable element from the object.

In an embodiment, the positioning element is a door lock.

In an embodiment, the attractable element is a suction cup.

In an embodiment, the object is a notebook computer.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
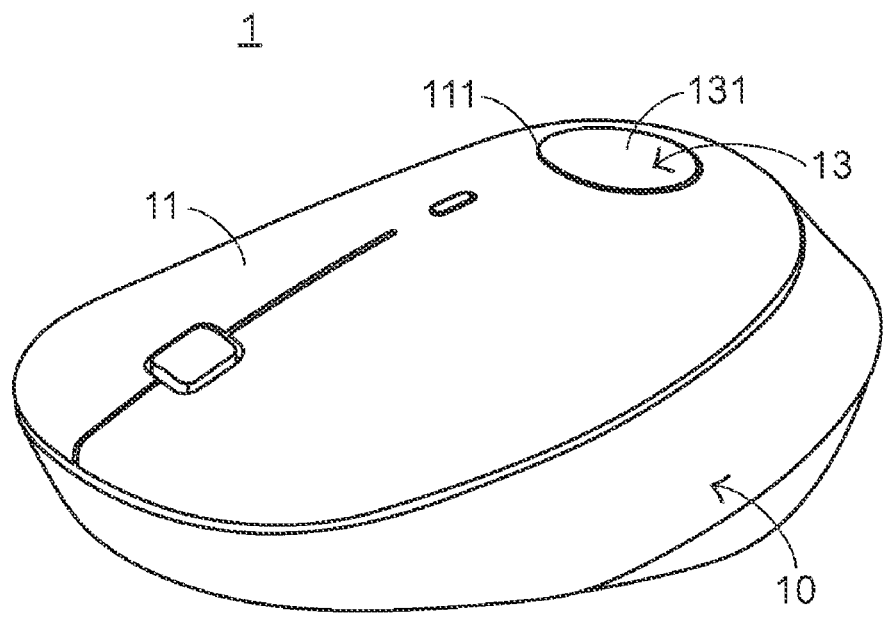
FIG. 1 is a schematic perspective view illustrating the outward appearance of a portable mouse according to an embodiment of the present invention.
Figure 2:
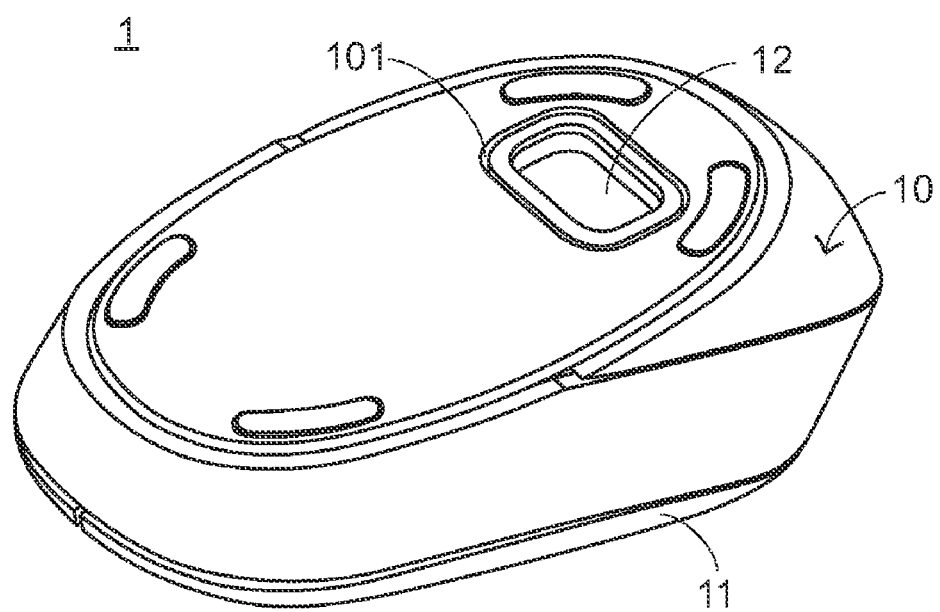
FIG. 2 is a schematic perspective view illustrating the outward appearance of the portable mouse shown in FIG. 1 and taken from a different viewpoint.

For obviating the drawbacks encountered from the prior art, the present invention provides a portable mouse that is easily carried. FIG. 1 is a schematic perspective view illustrating the outward appearance of a portable mouse according to an embodiment of the present invention. FIG. 2 is a schematic perspective view illustrating the outward appearance of the portable mouse shown in FIG. 1 and taken from a different viewpoint. The portable mouse 1 of the present invention could be attached on a surface of an object 2 (see FIG. 5). As shown in FIGS. 1 and 2, the portable mouse 1 comprises a base 10, a casing 11, an attractable element 12 and a control module 13. A base recess 101 is formed in the base 10. The attractable element 12 is accommodated within the base recess 101 and exposed to a surface of the base 10. An example of the attractable element 12 is a suction cup. The base 10 is sheltered by the casing 11. In addition, the casing 11 has a casing opening 111. The control module 13 is disposed on the base 10.

Figure 3:
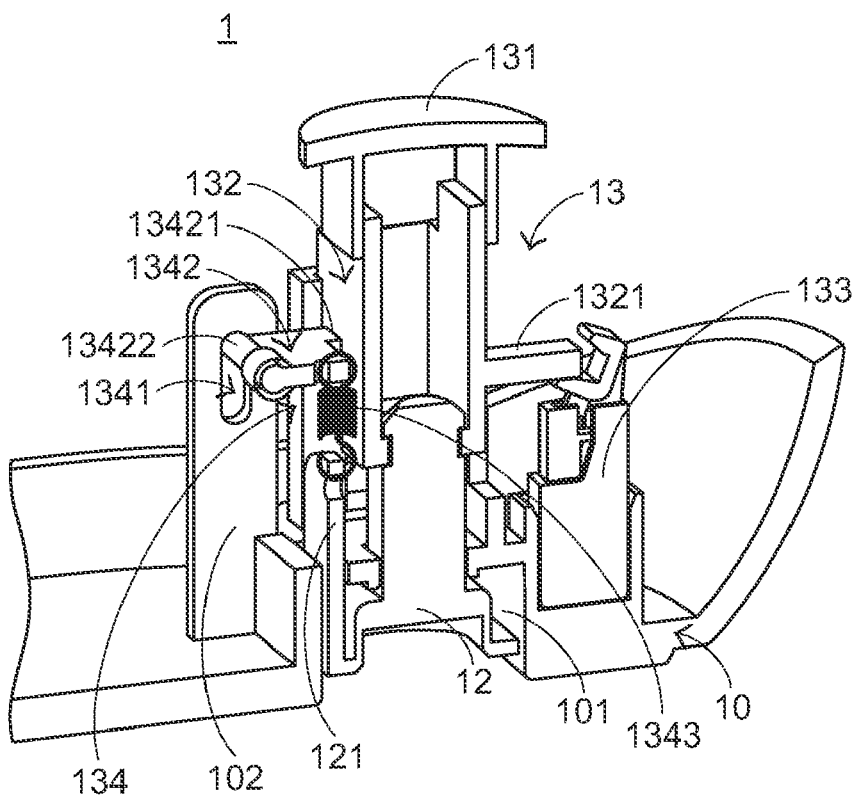
FIG. 3 is a schematic partial cutaway view illustrating the control module of the portable mouse according to an embodiment of the present invention, in which the control module is in a non-actuating status.

Hereinafter, the inner portion of the portable mouse 1 will be illustrated in more details with reference to FIG. 3. FIG. 3 is a schematic partial cutaway view illustrating the control module of the portable mouse according to an embodiment of the present invention, in which the control module is in a non-actuating status. As shown in FIG. 3, the base 10 further comprises a sliding slot seat 102. The attractable element 12 comprises a detaching part 121. It is preferred that the detaching part 121 is integrated into the attractable element 12. The control module 13 comprises a keycap 131, a triggering element 132, a positioning element 133 and a retractable mechanism 134. The keycap 131 penetrates through the casing opening 111 and is exposed outside the surface of the casing 11 (see FIG. 1). The triggering element 132 is arranged between the base 10 and the casing 11. The triggering element 132 is also connected with the keycap 131 and the attractable element 12. The attractable element 12 is moved in response to a position shift of the triggering element 132. The triggering element 132 comprises a fixing rod 1321 and a perforation 1322 (see FIG. 4). When the fixing rod 1321 is inserted into the positioning element 133, the position of the triggering element 132 could be fixed by the positioning element 133. The positioning element 133 is disposed on the base 10 and arranged at a first side of the triggering element 132. The positioning element 133 is in contact with the triggering element 132, so that the position of the triggering element 132 could be fixed by the positioning element 133. An example of the positioning element 133 includes but is not limited to a door lock.

The retractable mechanism 134 is connected with the attractable element 12 and in contact with the triggering element 132. The retractable mechanism 134 comprises a sliding slot 1341, a retractable slice 1342 and a spring 1343. The sliding slot 1341 is formed in the sliding slot seat 102. The spring 1343 is connected with the retractable slice 1342 and the detaching part 121 of the attractable element 12. When the spring 1343 is deformed, an elastic force is generated by the spring 1343. The retractable slice 1342 is arranged at a second side of the triggering element 132. The retractable slice 1342 comprises a protrusion 13421 and a retractable shaft 13422. The retractable shaft 13422 is arranged at a first end of the retractable slice 1342. In addition, the retractable shaft 13422 inserted into the sliding slot 1341, so that the retractable shaft 13422 is movable along the sliding slot 1341. The protrusion 13421 is arranged at a second end of the retractable slice 1342. The protrusion 13421 is inserted into the perforation 1322 of the triggering element 132 and contacted with the triggering element 132.

The configurations and the relationships of the components inside the portable mouse 1 have been described above. Moreover, the portable mouse 1 could be attached on a surface of an object 2. As a consequence, the portable mouse 1 could be directly held by the user's hand or simultaneously carried with the object 2 by another means. The operations of the portable mouse 1 will be illustrated in more details as follows.

Please refer to FIG. 3 again. In a case that the portable mouse 1 is not attached on the surface of an object 2, the portable mouse 1 is in a usage mode and could be operated to execute associated functions. At the same time, the keycap 131 is not depressed and the control module 13 is in a non-actuating status. In other words, the surface of the keycap 131 is coplanar with the surface of the casing 11. Meanwhile, the retractable shaft 13422 of the retractable slice 1342 is located in a first position of the sliding slot 1341 and the spring 1343 is in a stretched status. In addition, the fixing rod 1321 of the triggering element 132 is contacted with the positioning element 133, and the attractable element 12 is accommodated within the base recess 101.

Figure 4:
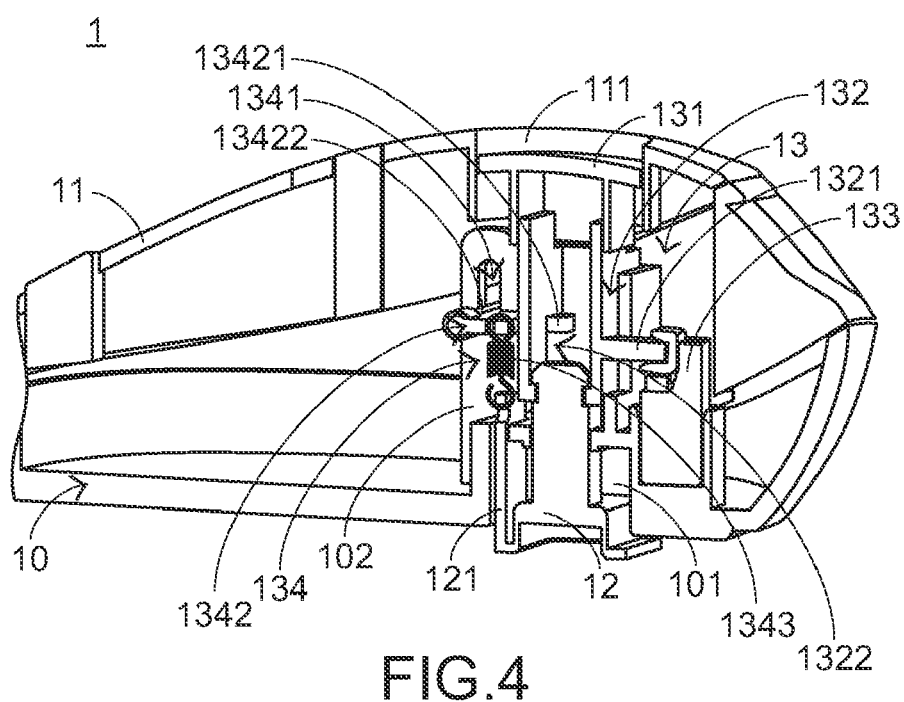
FIG. 4 is a schematic partial cutaway view illustrating the control module of the portable mouse according to an embodiment of the present invention, in which the control module is in an actuating status.

For simultaneously carrying the object 2 and the portable mouse 1, the portable mouse 1 could be firstly placed on the surface of the object 2. That is, the base 10 of the portable mouse 1 is in contact with the object 2. Next, the keycap 131 is depressed to actuate the control module 13. FIG. 4 is a schematic partial cutaway view illustrating the control module of the portable mouse according to an embodiment of the present invention, in which the control module is in an actuating status.

Figure 5:
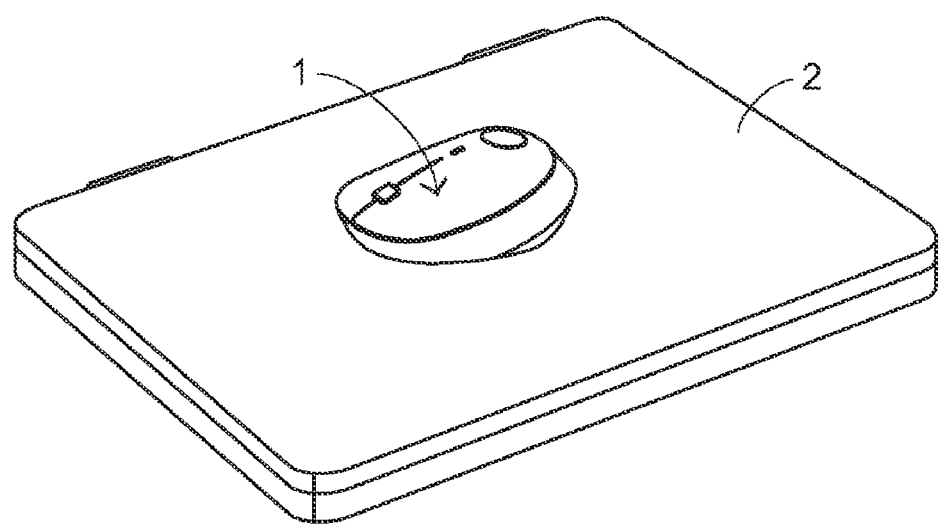
FIG. 5 is a schematic perspective view illustrating the present portable mouse attached on a surface of an object.

After the keycap 131 is depressed, the triggering element 132 is moved with the keycap 131. As such, the triggering element 132 is sustained against the retractable slice 1342 that is inserted into the perforation 1322, and then the retractable shaft 13422 of the retractable slice 1342 is moved from the first position to a second position. At the same time, the retractable slice 1342 is sustained against the spring 1343, so that the spring 1343 is in a compressed status. On the other hand, as the triggering element 132 is moved, the fixing rod 1321 is inserted into the positioning element 133, so that the triggering element 132 is fixed by the positioning element 133. As the fixing rod 1321 is moved, the fixing rod 1321 is engaged with the positioning element 133. Under this circumstance, the attractable element 12 is protruded out of the base recess 101, and the portable mouse 1 could be attached on the object 2 via the attractable element 12 (see FIG. 5). FIG. 5 is a schematic perspective view illustrating the present portable mouse attached on a surface of an object. As shown in FIG. 5, an example of the object 2 is a portable device such as a notebook computer. After the portable mouse 1 is attached on the notebook computer 2, the notebook computer 2 along with the portable mouse 1 could be carried by the user. Since the portable mouse 1 is firmly attached on the notebook computer 2, the portable mouse 1 will not drop off the surface of the notebook computer 2.

Figure 6:
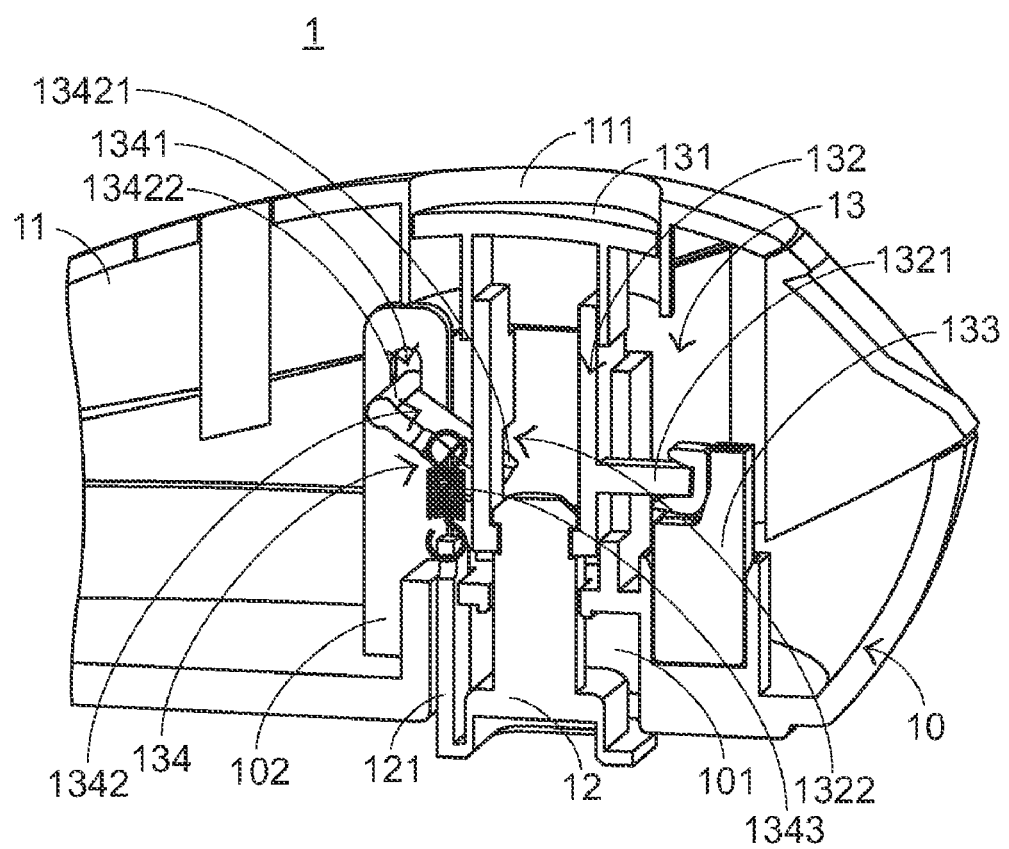
FIG. 6 is a schematic partial cutaway view illustrating a process of detaching the attractable element of the portable mouse from the object according to an embodiment of the present invention.

FIG. 6 is a schematic partial cutaway view illustrating a process of detaching the attractable element of the portable mouse from the object according to an embodiment of the present invention. For detaching the portable mouse 1 from the notebook computer 2, the keycap 131 needs to be depressed again. After the keycap 131 is depressed, the triggering element 132 and the attractable element 12 are moved downwardly. As the detaching part 121 is moved downwardly, the protrusion 13421 of the retractable slice 1342 is moved downwardly and swung within the perforation 1322 of the triggering element 132. As the triggering element 132 is moved downwardly, the engagement between the fixing rod 1321 and the positioning element 133 is relieved. Meanwhile, the fixing rod 1321 is detached from the positioning element 133 and the triggering element 132 is freely movable. On the other hand, since the fixing rod 1321 is no longer fixed by the positioning element 133, the spring 1343 is switched from the compressed status to the stretched status. Since the elastic force offered by the spring 1343 is exerted on the retractable slice 1342, the retractable shaft 13422 of the retractable slice 1342 is moved along the sliding slot 1341 from the second position to the first position. As such, the spring 1343 is moved upwardly with the retractable slice 1342, and the detaching part 121 is also moved upwardly with the spring 1343. Meanwhile, the attractable element 12 is returned to be accommodated within the base recess 101, and the surface of the keycap 131 is coplanar with the surface of the casing 11 again.

During the detaching part 121 is moved upwardly with the spring 1343, the detaching part 121 is uplifted and thus a space is created between the attractable element 12 and the surface of the notebook computer 2. At the same time, external air is introduced inside the space between the attractable element 12 and the surface of the notebook computer 2 to reduce the attractive force, thereby facilitating easy detachment of the attractable element 12 from the notebook computer 2.

From the above description, the portable mouse of the present invention could be switched between a usage mode and a portable mode by the simple mechanical transmission of the components. In the usage mode, the attractable element is received within the base recess without hindering operations of the portable mouse. In the portable mode, the portable mouse is attached on the surface of the notebook computer (or another object). As such, the portable mouse does not need to be held by the user's hand and the possibility of dropping off the mouse from the notebook computer will be minimized. In a case that the user travels to other places, the portable mouse could be attached on the surface of the notebook computer, and then the notebook computer along with the portable mouse could be placed in the portfolio. For a purpose of using the notebook computer, the portable mouse is easily detached from the notebook computer without the need of searching the portable mouse in the portfolio. In comparison with the prior art, the portable mouse of present invention is very user-friendly and has industrial utility. The concept of the present invention could be applied to portable wired mouse or portable wireless mouse. Moreover, the concept of the present invention could be applied to any mouse that contains the attractable element and associated connecting components as described in the present invention.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A portable mouse attachable on a surface of an object, said portable mouse comprising:
   a base comprising a base recess;
   a casing for sheltering said base;
   an attractable element disposed within said base recess and exposed to a surface of said base; and
   a control module disposed on said base for moving said attractable element, wherein said attractable element is accommodated within said base recess when said control module is in a non-actuating status, and said attractable element is protruded out of said base recess to be attached on said surface of said object when said control module is in an actuating status, wherein said control module comprises:
   a keycap exposed outside a surface of said casing;
   a triggering element connected with said keycap and said attractable element, wherein said attractable element is moved in response to a position shift of said triggering element;
   a positioning element disposed on said base and contacted with said triggering element; and
   a retractable mechanism connected with said attractable element and contacted with said triggering element, wherein said retractable mechanism comprises:
   a sliding slot;
   a retractable slice comprising a protrusion and a retractable shaft, wherein said retractable shaft is arranged at a first end of said retractable slice and inserted into said sliding slot such that said retractable shaft is movable along said sliding slot, and said protrusion is arranged at a second end of said retractable slice, inserted into said perforation of said triggering element and contacted with said triggering element; and
   a spring connected with said retractable slice and said attractable element for providing an elastic force;
   wherein if said keycap is not depressed and said control module in said non-actuating status, a surface of said keycap is coplanar with said surface of the casing, said retractable shaft of said retractable slice is located in a first position of said sliding slot, said spring is in a stretched status, said fixing rod of said triggering element is contacted with said positioning element, and said attractable element is accommodated within the base recess, wherein if said keycap is depressed and said control module in said actuating status, said triggering element is moved with said keycap to be sustained against the retractable slice such that said retractable shaft of said retractable slice is moved from said first position to a second position, said retractable slice is sustained against said spring such that said spring is in a compressed status, said fixing rod is moved to be inserted into said positioning element such that said triggering element is fixed by said positioning element, and said attractable element is moved to be protruded out of said base recess such that said portable mouse is attached on said object via said attractable element.

2. The portable mouse according to claim 1 wherein said casing further comprises a casing opening, and keycap of said control module penetrates through said casing opening to be exposed outside said surface of said casing.

3. The portable mouse according to claim 1 wherein said triggering element further comprises:
   a fixing rod inserted into said positioning element, so that a position of said triggering element is fixed by said positioning element; and
   a perforation, wherein said retractable mechanism is inserted into said perforation and contacted with the said triggering element.

4. The portable mouse according to claim 1 wherein said base further includes a sliding slot seat, and said sliding slot is formed in said sliding slot seat.

5. The portable mouse according to claim 1 wherein said attractable element further comprises a detaching part, which is connected with said spring.

6. The portable mouse according to claim 5 wherein said detaching part is integrated into said attractable element.

7. The portable mouse according to claim 5 wherein if said portable mouse is attached on said object and said keycap is depressed, said triggering element is moved toward said base such that said fixing rod disengages from said positioning element, and said spring is switched from said compressed status to said stretched status to offer said elastic force, wherein in response to said elastic force, said spring is sustained against said retractable shaft and said detaching part is moved with said spring, so that said retractable shaft is moved from said second position to said first position, said surface of said keycap is coplanar with said surface of said casing and said attractable element is returned to be accommodated within said base recess.

8. The portable mouse according to claim 7 wherein during said detaching part is moved with said spring, said detaching part is uplifted and air is introduced inside the space between said attractable element and said object, thereby facilitating easy detachment of said attractable element from said object.

9. The portable mouse according to claim 1 wherein said positioning element is a door lock.

10. The portable mouse according to claim 1 wherein said attractable element is a suction cup.

11. The portable mouse according to claim 1 wherein said object is a notebook computer.

12. A portable mouse attachable on a surface of an object, said portable mouse comprising:
- a base comprising a base recess;
- a casing for sheltering said base, wherein said casing has a casing opening;
- an attractable element disposed within said base recess and exposed to a surface of said base;
- a keycap penetrating through said casing opening and exposed outside a surface of said casing;
- a triggering element connected with said keycap and said attractable element, and arranged between said base and said casing, wherein said attractable element is moved in response to a position shift of said triggering element;
- a positioning element disposed on said base, arranged at a first side of said triggering element, and contacted with said triggering element;
- a sliding slot;
- a retractable slice arranged at a second side of said triggering element, and comprising a protrusion and a retractable shaft, wherein said retractable shaft is arranged at a first end of said retractable slice and inserted into said sliding slot such that said retractable shaft is movable along said sliding slot, and said protrusion is arranged at a second end of said retractable slice and contacted with said triggering element such that said protrusion is moved with said triggering element; and
- a spring connected with said retractable slice and said attractable element for providing an elastic force,
- wherein if said keycap is not depressed and said control module in said non-actuating status, a surface of said keycap is coplanar with said surface of the casing, said retractable shaft of said retractable slice is located in a first position of said sliding slot, said spring is in a stretched status, said fixing rod of said triggering element is contacted with said positioning element, and said attractable element is accommodated within the base recess, wherein if said keycap is depressed and said control module in said actuating status, said triggering element is moved with said keycap to be sustained against the retractable slice such that said retractable shaft of said retractable slice is moved from said first position to a second position, said retractable slice is sustained against said spring such that said spring is in a compressed status, said fixing rod is moved to be inserted into said positioning element such that said triggering element is fixed by said positioning element, and said attractable element is moved to be protruded out of said base recess such that said portable mouse is attached on said object via said attractable element.

13. The portable mouse according to claim 12 wherein said triggering element further comprises:
- a fixing rod inserted into said positioning element, so that a position of said triggering element is fixed by said positioning element; and
- a perforation, wherein said retractable mechanism is inserted into said perforation and contacted with the said triggering element.

14. The portable mouse according to claim 12 wherein said base further includes a sliding slot seat, and said sliding slot is formed in said sliding slot seat.

15. The portable mouse according to claim 12 wherein said attractable element further comprises a detaching part, which is connected with said spring.

16. The portable mouse according to claim 15 wherein said detaching part is integrated into said attractable element.

17. The portable mouse according to claim 15 wherein if said portable mouse is attached on said object and said keycap is depressed, said triggering element is moved toward said base such that said fixing rod disengages from said positioning element, and said spring is switched from said compressed status to said stretched status to offer said elastic force, wherein in response to said elastic force, said spring is sustained against said retractable shaft and said detaching part is moved with said spring, so that said retractable shaft is moved from said second position to said first position, said surface of said keycap is coplanar with said surface of said casing and said attractable element is returned to be accommodated within said base recess.

18. The portable mouse according to claim 17 wherein during said detaching part is moved with said spring, said detaching part is uplifted and air is introduced inside the space between said attractable element and said object, thereby facilitating easy detachment of said attractable element from said object.

19. The portable mouse according to claim 12 wherein said positioning element is a door lock.

20. The portable mouse according to claim 12 wherein said attractable element is a suction cup.

21. The portable mouse according to claim 12 wherein said object is a notebook computer.

* * * * *